United States Patent [19]

Nanno et al.

[11] Patent Number: 4,790,628
[45] Date of Patent: Dec. 13, 1988

[54] APPARATUS FOR ACTUATING OBJECTIVE LENS

[75] Inventors: Ikuo Nanno; Atsunobu Nakajima; Seiji Hoshi; Hiroyoshi Yamamoto, all of Tokyo, Japan

[73] Assignee: Seiko Instruments & Electronics Ltd., Tokyo, Japan

[21] Appl. No.: 937,603

[22] Filed: Dec. 3, 1986

[30] Foreign Application Priority Data

Dec. 17, 1985 [JP] Japan ................... 60-283735

[51] Int. Cl.$^4$ .................... G02B 7/02; G11B 5/09
[52] U.S. Cl. ...................... 350/247; 350/255; 350/DIG. 3; 369/45
[58] Field of Search ......... 350/247, 245, 255, DIG. 3; 248/206.5, 309.4; 369/43, 44, 45

[56] References Cited

U.S. PATENT DOCUMENTS 4,473,274 9/1984 Yano et al. .............. 350/255
4,571,026 2/1986 Maruta ................... 350/247
4,664,476 5/1987 Kasuga .................. 350/247

FOREIGN PATENT DOCUMENTS 0229750 12/1984 Japan ..................... 350/255

Primary Examiner—John K. Corbin
Assistant Examiner—Kachmarik, Ronald M.
Attorney, Agent, or Firm—Bruce L. Adams; Van C. Wilks

[57] ABSTRACT

An axially focusable objective lens is retained in a neutral position in the axial focusing direction by means of at leaast one magnetic member disposed inside or near the ends of magnetic gaps formed by yokes and magnets. The magnetic member is mounted on the periphery of a retaining tube which carries the objective lens and is positioned in the magnetic gaps which exhibit a non-uniform magnetic field distribution so that the magnetic member is subjected to a force acting in a direction in which the potential energy becomes stable. This force is utilized as a magnetic spring in the axial focusing direction. The magnetic spring requires no additional space thereby enabling a reduction in the size of the actuator and achieving excellent temperature characteristics.

13 Claims, 9 Drawing Sheets

APPARATUS FOR ACTUATING OBJECTIVE LENS

BACKGROUND OF THE INVENTION

1. Field of the Invention

The present invention relates to an actuator for use in an optical pickup, and more particularly, to the construction of a magnetic spring which acts in the focusing direction in an actuator of the type in which focusing and tracking are performed by sliding the lens in the axial direction and by rotating it about a shaft, respectively.

2. Description of the Prior Art

In an actuator of the type in which focusing and tracking are conducted by sliding a lens in the axial direction and rotating it about a shaft, respectively, it is common to use a rubber spring as a focusing spring. FIG. 2 shows an example of such a conventional actuator. In the Figure, one end of a rubber spring 21 is fixed to a pin 23 set up in a fixed portion such as a yoke, and the other end thereof is fixed through a pin 22 to an objective lens retaining tube 1 constituting a moving portion. In consequence, when the objective lens moves in the focusing direction indicated by A, the objective lens is retained by the resilient force of the rubber spring 21, thereby maintaining the focusing stability.

This conventional method of retention by a rubber spring, however, requires the provision of space for the rubber spring, and is therefore very inconvenient from the viewpoint of the desirability of reducing the size of the pickup, which has been requested more and more in recent years.

If the rubber spring is inaccurately mounted in such a way that it is disclosed, nonlinearity may be generated in the spring action. This makes the process of mounting the rubber spring very troublesome.

In addition, the rubber spring does not have good temperature characteristics due to the physical properties of its material, and is subjected to deterioration as its resonance frequency or sensitivity changes.

SUMMARY OF THE INVENTION

It is an object of the present invention to provide an actuator which requires no space for a spring to be used for focusing, which is easily manufactured, and which exhibits excellent temperature characteristics, thereby overcoming the problems of the conventional actuator.

To this end, there is provided an actuator which incorporates magnetic pieces mounted on the annular peripheral portion of an objective lens retaining tube so as to form a magnetic spring acting in the focusing direction by the interaction between the magnetic piece and a magnetic circuit, thereby reducing the size of the actuator, simplifying the manufacturing process and improving the temperature characteristics.

The present invention is based on the principle that a magnetic piece, when placed in a magnetic field which has non-uniform magnetic field distribution, is subjected to a force acting in the direction in which the potential energy of the magnetic piece becomes stable, and the apparatus utilizes this force as a spring force to be used for focusing.

Specifically, magnetic pieces are attached to the peripheral portion of the objective lens retaining tube such that they are disposed at the center or near the ends of two magnetic gaps as viewed in the axial direction. The magnetic gaps form a magnetic field in which the magnetic flux density becomes maximum at the center and gradually decreases farther from the center owing to leakage flux. In consequence, when the objective lens retaining tube slides in the focusing direction and the magnetic pieces are located apart from the center, they are subjected to a force which tends to pull them back into the magnetic gaps. This force constitutes a magnetic spring force in the focusing direction.

DETAILED DESCRIPTION OF THE PREFERRED EMBODIMENT

Figure 1:
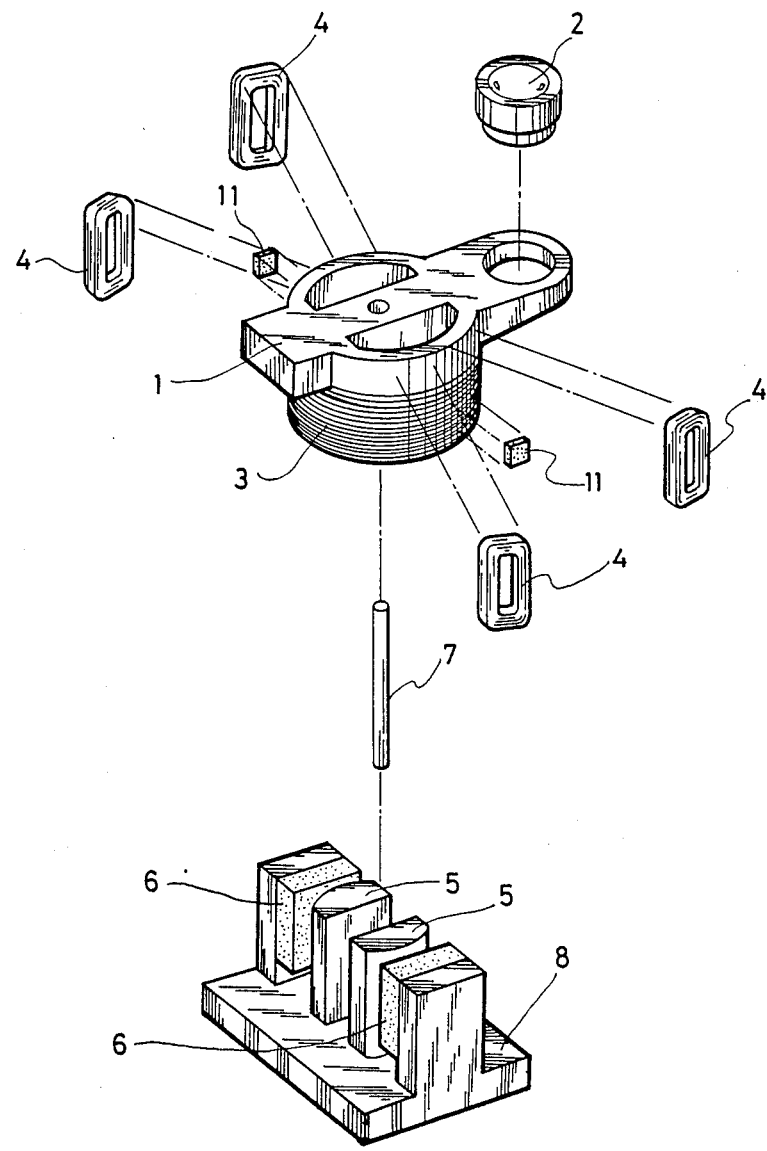
FIG. 1 is a perspective view of an actuating apparatus of the present invention.
Figure 2:
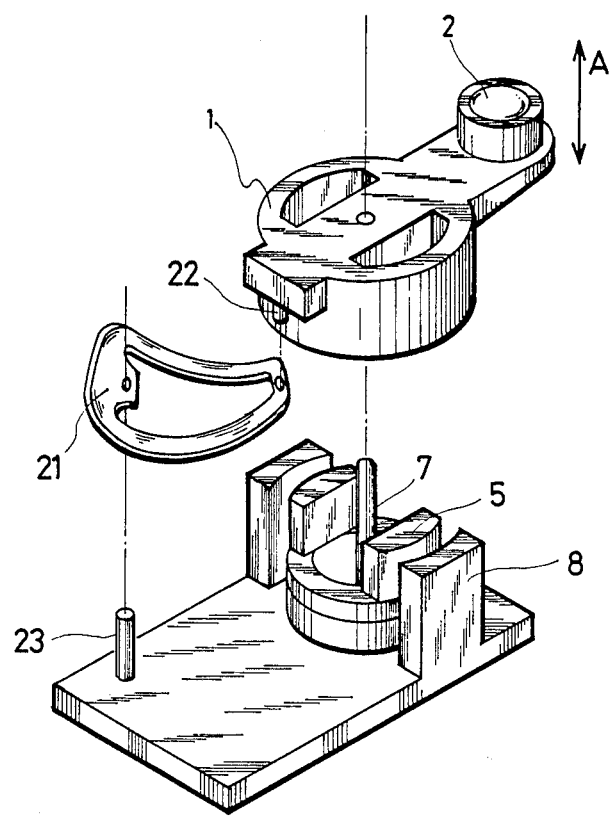
FIG. 2 is a perspective view of a conventional apparatus of retention provided with a rubber spring.

An embodiment of the present invention will be described hereinunder with reference to the accompanying drawings. Referring first to FIG. 1, an objective lens retaining tube 1 is provided with an optical element in the form of a objective lens 2, a focusing coil 3, tracking coils 4 and two magnetic members or pieces 11, and can be rotated about an axis of a supporting shaft 7 and be slid in the axial direction of the supporting shaft 7. The focusing coil 3, tracking coils 4 and magnetic pieces 11 are positioned in magnetic gaps defined by a radially inner surface of inner yokes 5, a radially outer surface of magnets 6 and outer yokes 8.

Figure 3:
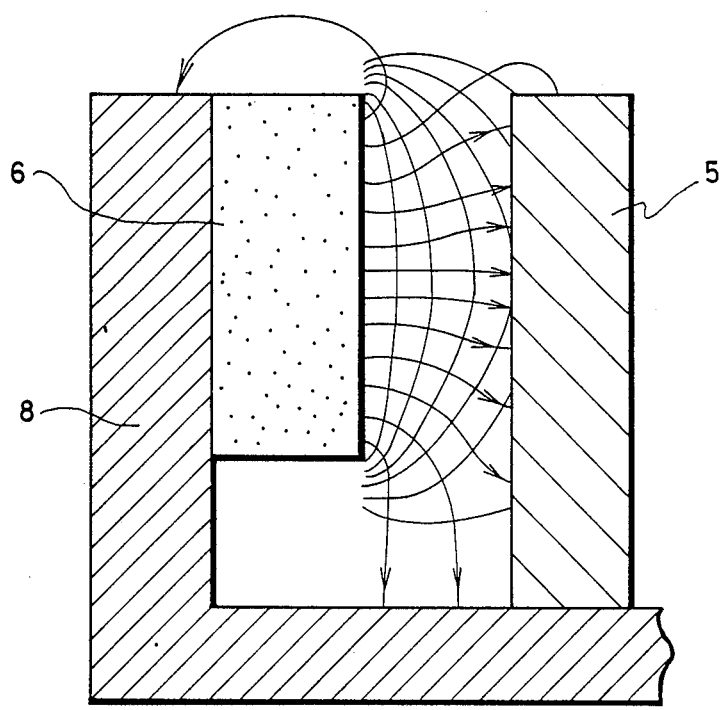
FIG. 3 is a side cross-sectional view illustrating the magnetic field distribution in a magnetic gap, which is obtained in a first embodiment of the present invention.
Figure 4:
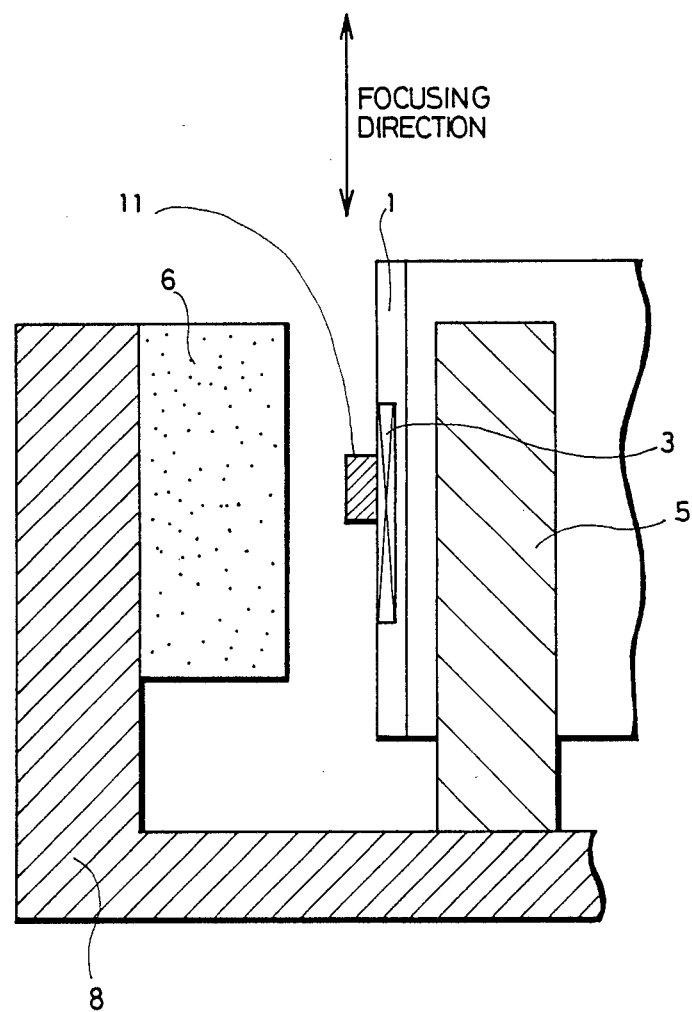
FIG. 4 is a side cross-sectional view illustrating the position of the magnetic pieces in an actuator of the first embodiment of the present invention.

FIG. 3 shows the magnetic field distribution in the magnetic gap. The lines with arrows at one end indicate lines of magnetic force. The density of these magnetic force lines represents the intensity of the magnetic field. Points of equal magnetic field intensity are connected with solid lines to show the magnetic field distribution. In the magnetic gap, the magnetic flux density becomes maximum at the center and decreases as it goes away from the center due to leakage flux, as can be seen in the figure. As shown in FIG. 4, a magnetic piece 11 is disposed at the center of the magnetic gap which exhibits such a magnetic field distribution.

Referring to FIG. 4, when the objective lens retaining tube moves in the axially upward direction in the focusing direction, i.e., in the vertical direction as viewed in the figure, the magnetic piece 11 is moved into a magnetic field in which the magnetic flux density gradually decreases, and is therefore subjected to a force which is generated by its potential energy and which tends to retain the magnetic piece 11 at the center of the magnetic gap. The retaining force acts on the magnetic piece in proportion to the displacement thereof.

When the objective lens retaining tube moves in the axially direction, a magnetic force is similarly applied to the magnetic piece and attracts it back toward the center of the magnetic gap. A magnetic spring for use in focusing the objective lens is thus formed.

Figure 5:
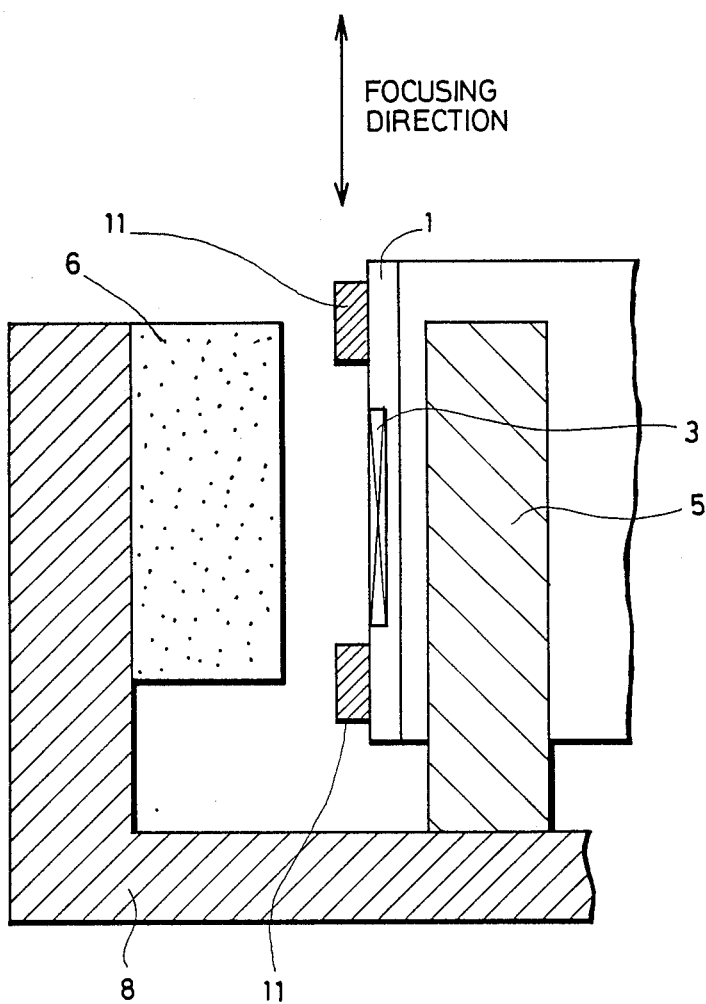
FIG. 5 is a side cross-sectional view illustrating the position of the magnetic pieces employed in an actuator of another embodiment of the present invention.
Figure 6A:
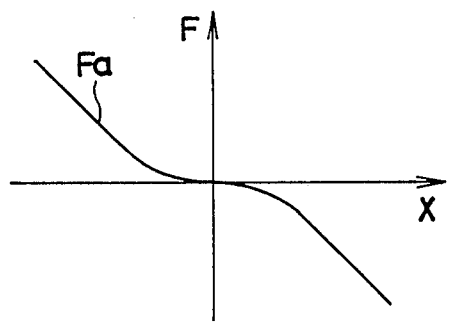
FIG. 6a shows a graph illustrating the magnetic spring force acting in the focusing direction, when the magnetic piece is provided at the center of the gap corresponding to FIG. 4.
Figure 6B:
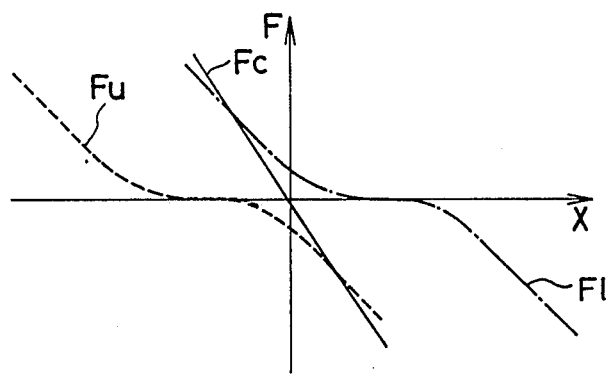
FIG. 6b shows a graph illustrating the magnetic spring force acting in the focusing direction, when the magnetic pieces are provided at the upper and lower ends of the gap corresponding to FIG. 5.
Figure 7:
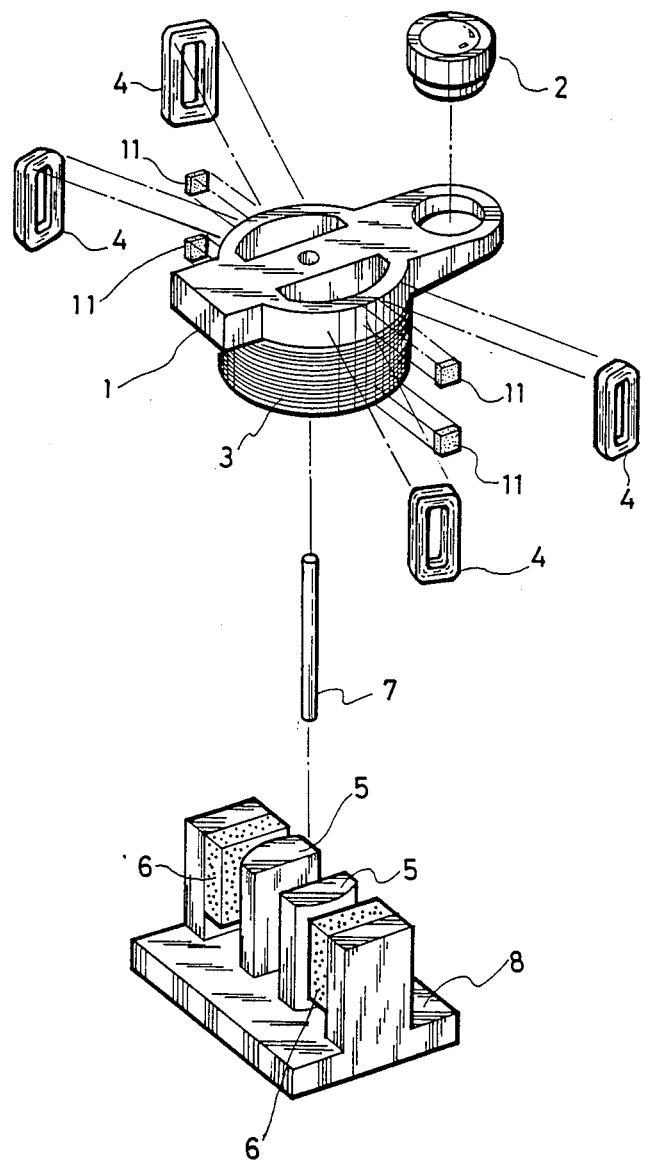
FIG. 7 is a perspective view of another embodiment of an actuating apparatus according to the present invention.

In this embodiment, the magnetic piece 11 is spaced away from the radially innermost portion of the magnet 6 and the radially outermost portion of the inner yoke 5 at the center of the magnetic gap to thereby allow the movable tube 1 to freely move in the axial or focusing direction. However, as shown in FIG. 5, the actuator of the present invention may have two magnetic pieces 11 respectively provided at the upper and lower ends of the gap. This enables the formation of a magnetic spring for focusing which has further linear characteristics. FIGS. 6a and 6b show graphs illustrating how the spring force is made linear by providing the magnetic piece 11 at the upper and lower ends of the gap. As shown in FIG. 6a, a spring force Fa shows non-linear characteristics, strictly speaking, when the magnetic piece is provided only at the center. A linear spring force Fc for focusing, such as the one shown by the solid line in FIG. 6b, is available only when combined magnetic spring forces are provided by the magnetic pieces mounted at the upper and lower ends of the gap, which are shown by broken lines Fu and chain lines Fl, respectively. In these figures, vertical axis F relates the magnetic spring force in the focusing direction and horizontal axis X relates the position of the objective lens retaining tube 1 in the focusing direction. FIG. 7 is a perspective view of the actuator with the magnetic pieces 11 provided at the upper and lower ends of the gap.

Figure 8:
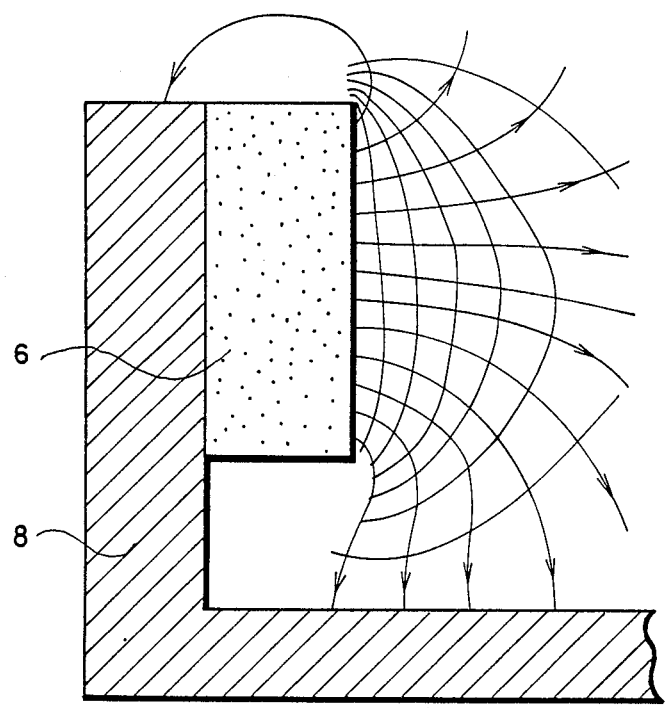
FIG. 8 is a side cross-sectional view illustrating the magnetic field distribution in a magnetic gap, which is obtained in another embodiment of the present invention.

A magnetic spring acting in the focusing direction can similarly be formed in an actuator which does not have the inner yokes 5. FIG. 8 is a side cross-sectional view illustrating the magnetic field distribution in a magnetic gap in this case. The lines with arrows provided at one end indicate lines of magnetic force. The solid lines connect the points of equal intensity of the magnetic field. Although the magnetic field distribution when there are no inner yokes 5 is slightly different from the one shown in FIG. 3, it is possible to form substantially the same magnetic spring for focusing.

The actuator of these embodiments employs a magnetic piece 11 of a rectangular configuration. However, it may be round in shape, or may be shaped in the form of a ring which can be fitted or attached to the retaining tube. It may also be shaped into a rectangle which has longer sides in the axial direction or in the circumferential direction.

Figure 9:
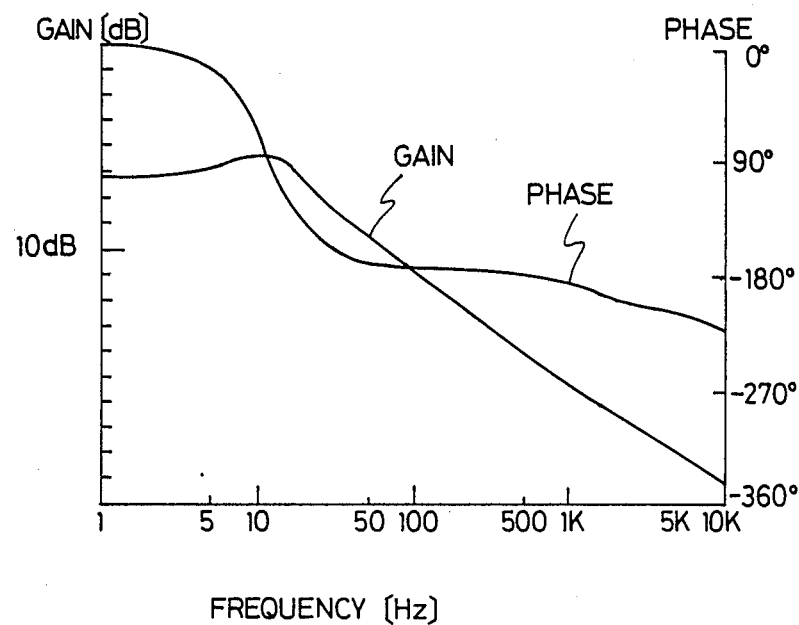
FIG. 9 shows the results of measurement of the frequency characteristics obtained in the embodiments of the present invention.

FIG. 9 is a graph illustrating the frequency characteristics obtained in the actuator of these embodiments. This graph shows that no harmonics of vibrations are generated so that very excellent spring characteristics are available.

As is clear from the foregoing description, according to the present invention, a magnetic spring to be used in focusing can be constructed by simply attaching magnetic pieces to the objective lens retaining tube. In consequence, the space required for the rubber spring in the conventional actuator can be eliminated, thereby contributing to a reduction in the size of the actuator.

When retention is performed by a rubber spring, since it is difficult to mount it accurately without distorting the rubber, nonlinearity may be generated in the spring action. On the contrary, it is relatively easy to attach magnetic pieces to the objective lens retaining tube with accuracy, and the magnetic spring obtained is therefore almost free from such problems.

Since the magnetic spring utilizes a magnetic action, it has very excellent temperature characteristics, compared with the conventional rubber spring.

What is claimed is:

1. In an apparatus for actuating an objective lens having an objective lens retaining tube which is rotatable about a supporting shaft and slidable in the axial direction of the supporting shaft, an objective lens mounted on the objective lens retaining tube such that the objective lens is spaced apart from the supporting shaft, coil means for effecting focusing of the objective lens, the coil means being mounted on a peripheral portion of the objective lens retaining tube, and yokes and magnets mounted either inside or outside of the objective lens retaining tube so as to form magnetic gaps such that the coil means is positioned in the magnetic gaps, the improvement comprising: at least one magnetic member mounted on the peripheral portion of the objective lens retaining tube and disposed entirely inside of each of the magnetic gaps or near the ends of each of the magnetic gaps, as viewed in the axial direction, so as to retain the objective lens at a neutral position in the axial direction.

2. An apparatus for actuating an objective lens according to claim 1; including a plurality of magnetic members mounted at least in one pair of positions inside each of the magnetic gaps or near the ends thereof as viewed in the axial direction, where inclinations of the magnetic field intensity in the axial direction are contrary to each other.

3. An apparatus for actuating an objective lens according to claims 1 or 2; wherein the yokes are constituted by inner and outer yokes which are mounted inside and outside of the objective lens retaining tube, respectively.

4. An apparatus for actuating an objective lens according to claims 1 or 2; wherein a yoke is mounted either inside or outside of the objective lens retaining tube.

5. An apparatus for actuating an objective lens according to claims 1 or 2; wherein the magnet is positioned between the yoke disposed outside of the objective lens retaining tube and the peripheral portion of the objective lens retaining tube.

6. In an apparatus for actuating an optical element along an axis: stationary means having a pair of inner and outer surfaces spaced apart from each other in a radial direction relative to the axis, the inner and outer surfaces extending in the axial direction to define therebetween a magnetic gap effective to induce therein a magnetic force; movable means disposed in the magnetic gap to undergo movement in the axial direction for supporting thereon the optical element; actuating means mounted on the movable means within the magnetic gap for movement therewith and cooperative with the magnetic gap to receive a magnetic driving force in the axial direction for actuating the movable means in the axial direction; and retaining means mounted on the movable means within the magnetic gap for movement therewith and cooperative with the magnetic gap during other than the actuation of the movable means to receive a magnetic retaining force in the axial direction for retaining the movable means in the axial direction, the retaining means being spaced from both the radially innermost portion of the stationary means outer surface and the radially outermost portion of the stationary means inner surface in the radial direction to thereby allow the movable means to freely move in the axial direction during the actuation thereof.

7. An apparatus according to claim 6; wherein the retaining means comprises a magnetic piece positioned within the magnetic gap to determine a neutral position of the movable means in the axial direction when the same is retained by the retaining means.

8. An apparatus according to claim 7; including a magnetic piece positioned at an axially central portion of the magnetic gap when the movable means is retained.

9. An apparatus according to claim 7; including a pair of magnetic pieces positioned at axially opposite end portions of the magnetic gap when the movable means is retained.

10. An apparatus according to claim 6; wherein the movable means comprises a central section supported by the stationary means slidably in the axial direction and rotatably in a circumferential direction about the axis, and an annular peripheral section disposed within an annular magnetic gap.

11. An apparatus according to claim 10; wherein the stationary means has a pair of inner and outer surfaces to define an annular magnetic gap extending linearly in the axial direction and arcuately in the circumferential direction.

12. An apparatus according to claim 11; wherein the stationary means includes an inner yoke having an inner surface, an outer yoke opposed to the inner yoke in the radial direction, and a magnet member disposed on the outer yoke and having an outer surface.

13. An apparatus according to claim 12; wherein the actuating means includes a first coil for actuating the movable means in the axial direction and a second coil for actuating the movable means in the circumferential direction.

* * * * *